United States Patent [19]

Lajoie

[11] 4,064,307

[45] Dec. 20, 1977

[54] MOLDING AND COATING COMPOSITIONS

[75] Inventor: Joseph Leopold Lajoie, Terrasse Vaudreuil, Canada

[73] Assignee: L. Lajoie Inc., Terrasse Vaudreuil, Canada

[21] Appl. No.: 733,311

[22] Filed: Oct. 18, 1976

[51] Int. Cl.² .............................................. D02G 3/00
[52] U.S. Cl. .................. 428/310; 260/2.5 E; 260/2.5 F; 428/376; 428/394; 428/398; 428/489; 428/524
[58] Field of Search ................. 260/2.5 F, 2.5 E; 428/63, 376, 394, 397, 398, 489, 310, 315, 524

[56] References Cited

U.S. PATENT DOCUMENTS

| 3,320,188 | 5/1967 | Dykema | 260/28.5 A |
|---|---|---|---|
| 3,480,507 | 11/1969 | Gouw et al. | 260/2.5 E |
| 3,553,070 | 1/1971 | Sparks | 428/311 |
| 3,884,030 | 5/1975 | Baxter et al. | 428/310 |
| 3,944,708 | 3/1976 | Dumas | 428/398 |

*Primary Examiner*—William J. Balen
*Attorney, Agent, or Firm*—Bacon & Thomas

[57] ABSTRACT

Compositions are provided which employ a fibrous, cellular, absorbent organic material in place of asbestos fiber as a reinforcing and thickening additive; a wide variety of compositions including cements, sealants and paints can be made; a particularly preferred fibrous material is a foamed urea-formaldehyde crushed to a fibrous mass.

15 Claims, No Drawings

MOLDING AND COATING COMPOSITIONS

BACKGROUND OF THE INVENTION a. Field of the Invention

This invention relates to compositions containing a thickening and reinforcing fibrous organic material in an organic binder and a liquid vehicle for the binder; more particularly the invention is concerned with the use of a fibrous organic material in place of asbestos fibres in a wide variety of moldable, brushable and sprayable compositions, for example, sealants, roofing cements and coating compositions.

b. Description of the Prior Art

Asbestos a complex mineral fibre derived from the mineral crysolite composed mainly of magnesium, aluminium silicates is widely used as a filler having both reinforcing and thickening properties in a variety of moldable, brushable and sprayable compositions. Such moldable compositions include plastic cements, roofing cements, sealants, caulking compositions, weather proofing compositions, roof coating compositions, insulation coating compositions and sheet forming compositions. Brushable and sprayable compositions include paints intended to provide protective surfaces.

The reason for the widespread use of asbestos is that it is the only natural mineral which combines a number of important properties in one material; particularly asbestos produces the following properties when incorporated in binder-containing compositions in appropriate amounts:

a. produces rapid thickening
b. produces short-bodied consistency
c. produces good spreadability or knifability
d. produces good homogeneity
e. prevents internal slippage
f. produces a composition of stable consistency
g. imparts good weatherability
h. reinforces coatings and self-supporting sheets produced from the composition.

In addition asbestos has the advantage that it is low in cost, and the disadvantage that it promotes internal oxidation of the compositions which may result in deterioration.

Recently asbestos has been exposed as a carcinogenic substance causing asbestosis, a lung disease that often develops into cancer of the respiratory system. A world wide medical attack has been launched triggering governmental controls in the handling of asbestos at the mines as well as in industries which use or process asbestos. Such controls may cost industries millions of dollars, for example, in the installation of air purifying equipment, which ultimately will result in higher prices of asbestos-containing products to the consumer. Further medical research may even cause governments to ban the use of asbestos in consumer products such as floor tiles and sealants.

It is clearly highly desirable to find an alternative to asbestos fibres which will produce the desirable physical characteristics in compositions which are characteristic of asbestos-containing compositions.

It is an object of this invention to provide an alternative to asbestos as a reinforcing and thickening agent in a variety of compositions, which alternative does not display the hazards associated with the use of asbestos.

It is a further object of this invention to provide a variety of compositions including moldable and trowellable compositions and brushable and sprayable compositions containing an organic fibrous reinforcing and thickening agent.

It is yet another object of this invention to provide self-supporting sheet products containing an organic fibrous reinforcing and thickening agent.

It is still a further object of this invention to provide a coating containing an organic fibrous reinforcing and thickening agent.

SUMMARY OF THE INVENTION

According to the invention there is provided a composition comprising an organic binder in a liquid vehicle having dispersed therein a thickening and reinforcing amount of an amorphous, fibrous, cellular, absorbent organic material.

The liquid vehicle is suitably a solvent for the organic binder; however, it is also possible to employ a liquid, for example, water, in which the organic binder can be emulsified suitably with appropriate emulsifying agents.

The compositions of the invention may contain a wide variety of ingredients of a conventional nature, depending on the intended utility of the composition, for example, pigments, dyes, inert fillers, driers, hardeners, catalysts, tackifiers, extenders and plasticizers.

The compositions of the invention may be provided as moldable or trowellable compositions or as brushable or sprayable compositions depending on the specific ingredients and their relative amounts, having regard to the desired application of the composition.

According to another aspect of the invention there is provided a coated substrate in which the coating comprises a film-forming organic binder containing a reinforcing amount of an amorphous, fibrous, cellular, absorbent, organic material.

According to yet another aspect of the invention there is provided a self-supporting sheet comprising a sheet forming organic binder containing a reinforcing amount of an amorphous, fibrous, cellular, absorbent, organic material.

DESCRIPTION OF THE PREFERRED EMBODIMENT

Fibrous Material

The fibrous material employed in the invention is a synthetic organic amorphous, fibrous, cellular material which is highly absorbent.

The physical structure of the fibrous material is capable of high adsorption or absorption of the organic binder in its liquid vehicle producing a thickened short-bodied composition stable to vibration, stirring, slump, spraying, trowelling and other mechanical disturbances. In this respect it appears that the high absorption and adsorption characteristics attract some of the binder establishing a bonding system similar to steel reinforcing in concrete; and external forces applied to the reinforced binder do not easily cause deformation and rupture of the binder.

Manufacture of Urea-Formaldehyde Fibrous Material

A particularly preferred fibrous material is obtained by shredding or otherwise disintegrating a cellular plastic produced by foaming a water-soluble urea-formaldehyde pre-condensate. The cellular plastic is suitably produced from an aqueous solution of the urea-formaldehyde pre-condensate and an aqueous solution of a foaming agent. The foaming agent solution is foamed by stirring or by introducing compressed air, for example, as described in German Pat. No. 636,658 I. G. Farben of Dec. 29, 1933, and the aqueous solution of the urea-formaldehyde pre-condensate is added to the foam and thus assumes the cellular structure. Suitable foaming agents include alkyl naphthalene sulphonic acids, for example butyl naphthalene sulphonic acid, and other weak sulphur-acids.

The urea-formaldehyde pre-condensate is suitably that available under the trademark Resin 293 Powder from Badische Anilin- & Soda-Fabrik AG and is usually processed in the form of a 38% aqueous solution (38 pts. wt. Resin 293 Powder in 62 pts. wt. water) which is allowed to mature for 15-20 hours before use.

The foaming composition is suitably Foaming Agent 514 Liquid or Foaming Agent 400 Liquid, both trademarks of Badische Anilin- & Soda-Fabrik AG.

Foaming Agent 514 Liquid is an aqueous solution of a cross-linking agent with a high foaming and emulsifying capacity and contains phosphoric acid for curing Resin 293 Powder.

Foaming Agent 404 Liquid is an aqueous solution of a synthetic cross-linking agent without curing action; it is suitable where an acid-free foaming agent is required.

These agents are described by the manufacturer and supplier, Badische Anilin- & Soda-Fabrik AG as having the following characteristics.

TABLE I

| Properties | Resin 293 Powder |
| --- | --- |
| Colour | white |
| Bulk density | 600 – 800 g/l |
| Moisture content[1] | max. 2% |
| Water tolerance[2] | 1:3 to 1:4,5 |
| Free formaldehyde[3] | 7.5 – 8.5% |
| Storage stability at 20° C | 1 year |
| Storage stability of 38% solution at 20° C | approx. 12 weeks |
| Density of the 38% solution at 20° C | 1.15 – 1.16 g/cm$^3$ |
| Free formaldehyde in the 38% solution | 3 –4% |

[1]With xylene according to Aufhauser.
[2]Water is added in small portions at 20°C to a 38% solution of the resin until the resin commences to flocculate. The total amount of water is expressed in terms of the solid resin.
[3]Cool 1 g of Resin 293 Powder + 5 g ethanediol to 5° C and add 20 ml of a 25% neutral Na$_2$SO$_3$ solution. Keep the mixture for 20 minutes at 5° C and then titrate with n-H$_2$SO$_4$ using phenolphthalein as indicator.

TABLE II

| Properties | Foaming Agent 514 Liquid |
| --- | --- |
| Foaming Agent 514 Liquid is a dark brown aqueous solution. | |
| Density at 20° C | 1.23 – 1.24 g/cm$^3$ |
| pH[4] | 0.7 ± 0.2 |
| Storage stability | unlimited |

[4]Glass electrodes. Determined after dilution with 10 parts by volume water.

TABLE III

| Properties | Foaming Agent 404 Liquid |
| --- | --- |
| Foaming Agent 404 Liquid is a dark brown aqueous solution. | |
| Denity at 20° C | 1.04 – 1.05 g/cm$^3$ |
| pH[4] | 7 – 8 |
| Storage stability | unlimited |

[4]Glass electrodes. Determined after dilution with 10 parts by volume water.

In manufacturing the fibrous urea-formaldehyde product the foaming agent (Foaming Agent 514 Liquid) is first thinned with water and then foamed by stirring or by compressed air. An aqueous solution, suitably a 38% aqueous solution of the urea-formaldehyde pre-condensate is added to the foam and at 20° C sets in about 10 to 60 seconds to a water-insoluble substance with a fine cellular structure. The setting time can be shortened by employing solutions at higher temperatures or by heating the air used for foaming. Further the setting time may be affected by the hardness and composition of the water used for thinning. The setting time can be further shortened by the addition of 1-2% of 70% phosphoric acid (technical) to the foaming agent solution. The setting time is longer with Foaming Agent 404 Liquid.

After setting condensation of the foam takes place in 2 to 4 hours and the condensed mass is dried to remove water.

The foaming is suitably controlled to produce a water-insoluble cellular product having a density of 0.4 to 0.7 lbs/cu. ft. with about 60% closed and 40% open cells. The foam shows evidence of some shrinkage, up to about 7% with fast drying but with slow drying shrinkage can be controlled to less than 1%. The cellular product is resilient but will give under loads exceeding about 0.2 lbs/sq.in. and is mechanically shredded or ground to a loose mass of multi-branched, feather-like fibres resulting from the cross-linked structure of the cellular product.

Physical Characteristics of Urea-Formaldehyde Fibrous Material

The fibrous cellular urea-formaldehyde material has a complex microscopic structure of closed and open cells interspersed with irregular and discontinuous capillaries, which gives the fibrous material adsorbent and absorbent properties.

Under a microscope at a magnification of 10 the fibrous material appears as a fluffy, white amorphous mass loosely agglomerated like absorbent cotton. At a magnification of 40 the fibrous material is transparent and made up of clumps 2 to 15 microns in diameter, interspersed with capillary tube-like particles or filaments from 5 to 50 microns in length. These "capillaries" occur as straight tubes with an external diameter up to 5 microns with thin transparent walls as well as L-shaped and Y-shaped tubes. The capillaries can be separate or they can be clumped together.

In order to retain the absorbent and reinforcing properties of the fibrous material it appears to be necessary to retain the fibrous capillary structure. This fibrous capillary structure is adequately retained when the foamed cellular product is ground to the above described dimensions. It is possible that adequate absorbing and reinforcing properties might be retained with dimensions outside these ranges, however, if the foamed cellular product is ground to a fine non-absorbent powder it will possess little if any reinforcing properties.

The fibrous materials may also have adsorbent properties which will enhance the thickening effect. However the absorbent property is more significant than the adsorption property.

The fibrous urea-formaldehyde material has a number of desirable characteristics which make it highly suitable as a thickening and reinforcing agent for the compositions of the invention and which make it advantageous over the use of asbestos.

i. the fibrous material is lipophilic (oleophilic) having an affinity for oils and substances that usually repel water.

ii. the fibrous material is hydrophobic displaying strong water repellency and does not absorb or retain water; it is also water-insoluble.

iii. the fibres of the fibrous material are apparently flexible and do not break easily when subjected to mechanical forces such as are produced in compression, agitation, mixing, trowelling and spraying.

iv. the fibrous material has a high melting point and melts at about 428° F, at 1,800° F it will carbonize; further it does not retain heat and can be considered non-burning or self-extinguishing; these properties make it suitable in high temperature applications.

v. the fibrous material is light-weight and colourless and can be used in clear compositions.

vi. the fibrous material is resistant to solvents such as petroleum distillates and coal tar derivatives.

vii. the fibrous material is non-toxic and is not carcinogenic like asbestos; when subjected to radiant heat or a flame of 1,300° F it decomposes releasing water vapour, oxygen, carbon dioxide and minor amounts of carbon monoxide and amines.

viii. the fibrous material is synthetic and made from readily available raw materials and can be made as desired throughout the world.

ix. the fibrous material can produce a thickening effect two to three times greater than a corresponding amount of asbestos, and is thus more economical.

xi. the fibrous material improves flow resistance at high shear rates since it acts as a thickening agent.

xii. the fibrous material is wet rapidly by oils and the like and thus disperses rapidly.

xiii. the fibrous material is not dusty.

xiv. the fibrous material is highly absorbent and this is responsible for many of its desirable characteristics.

xv. the fibrous material is mildly bactericidal and resists the common molds of the genus Mucor, Aspergilli and Alternaria.

The fibrous material is found to be compressible and can be compressed in a compression bagging machine and packaged in paper or plastic bags for shipment. The compression, due to the high resilience of the fibrous material, does not alter the structure or physical characteristics. Since the physical configuration is not altered by this compression, the fibrous material is easily dispersed by simple mechanical shearing action into the composition.

Other Fibrous Materials

Although particular attention has been given to the especially preferred urea-formaldehyde fibrous material other fibrous materials of similar physical structure and properties can also be employed in the compositions of the invention. In particular there may be mentioned those foamable condensation products chemically similar to urea-formaldehyde including melamine-formaldehyde, melamine urea-thiourea condensation products with formaldehyde, thiourea-formaldehyde and phenol-formaldehyde. Similarly other resin materials, plastics and polymers capable of being foamed to cellular, fibrous products with absorption properties such as are produced by capilliaries in the fibrous products can be employed.

Organic Binder

A wide variety of organic binders can be employed in the compositions of the invention depending on the particular application.

It will be recognized that the expression "organic binder" is employed in a generic sense to embrace different kinds of material. The binders will have different physical properties depending on the utility of the composition, but all will be solid substances which are solidifiable from the compositions to form a hard connecting medium between the fibrous material and other solid materials, for example, fillers which may be included in the composition.

In the case where the composition is a sealant or caulking composition the binder will be a generally adhesive material which partially hardens and retains its form; suitably the compositions form a hard, flexible skin on exposure to the air, the inner portion remaining pliable.

In the case where the composition is to be used to form a coating the organic binder will be selected from film forming organic materials which are solidifiable to form hard coatings.

Suitable binders include, bitumens; asphalts; pitches; natural and synthetic resins; natural and synthetic polymers; natural and synthetic rubber; styrene-butadiene rubbers; butyl rubbers, neoprene; Hycar (trademark) synthetic rubbers manufactured by B. F. Goodrich Chemical Co., including butadiene-acrylonitrile copolymers and acrylic acid ester polymers; acrylics, vinyls, styrenes, propylenes, polyurethanes, vegetable and animal oils and other binder substances commonly used for coatings, paints, vapour barriers, sealants, caulking compositions, mastics and putties.

Liquid Vehicle

The liquid vehicle is suitably a solvent for the organic binder. Volatile solvents are preferred since they are more readily removed after application of the composition by evaporation at room temperature; however, the liquid vehicle may similarly be removed by heating or forced air circulation.

The liquid vehicle chosen in any particular case will, of course, be dependent on the particular binder.

Liquid vehicles in which the binder is only partially soluble or insoluble can also be employed providing the binder can be dispersed, solubilized or otherwise introduced.

Liquid vehicles within the scope of the invention include bunker fuel oil; kerosene; high-flash straight petroleum aliphatic solvents such as those available under the trademark Varsol from Humble Oil & Refining Co.; light mineral spirits; naphtha; rubber solvents; hexane; pentane; coal tar distillates including xylene, toluene and benzene.

The liquid vehicle may also be water or other liquids in which the binder can be dispersed or emulsified using dispersing and emulsifying agents, soaps and synthetic surface active agents. To produce the dispersions or emulsions there are suitably employed colloid mills, high speed dispersers or shear-type equipment, for example Baker-Perkins, Bowers, Cowles and Charlotte mills.

Compositions

The amount of fibrous material included in the compositions will vary according to the intended use; suitably the fibrous material is employed in an amount of 1 to 30%, preferably 5 to 25% and more preferably 10 to 20%, by weight, of the binder.

The amount of liquid vehicle employed will be determined by the amount necessary to get the binder into solution, emulsion or dispersion as the case may be.

A part of the fibrous material may be replaced by other fibres including natural and synthetic staple fibres, for example, wool, rayon, nylon, polypropylene, phenol-formaldehyde, polyesters, cotton, sisal and other substances that can be formed into monofilaments and cut to an appropriate length for incorporation in the composition of the invention as reinforcing agents. The percentage of these fibres employed will be dependent upon the end product. However, these fibres alone are not satisfactory since they do not have the required liquid absorbent properties resulting from the intermeshed, feather-like structure.

As described the fibrous material can be employed in a variety of compositions within the scope of the invention; and the particular binders and liquid vehicles and the relative amounts of the ingredients will depend upon the kind of composition desired.

Depending on the particular composition, there may also be included a variety of conventional additives including fillers and extenders, for example, carbonates, silica, silicates, oxides, clays, carbon black, mica and barytes; pigments, for example, oxides and salt of zinc, iron, lead, titanium, calcium, magnesium and metal flakes; dyes, antioxidants, plasticizers, thickeners, stabilizers, softeners, hardeners, dispersing agents, drying agents, oxidizing agents and suspension agents.

The compositions of the invention include, for example, sealants and cements wherein the composition may be molded or trowled into a cavity; and coating compositions for producing coated surfaces, comprising a film-forming binder with fibrous material therein. The compositions may similarly be molded into self-supporting products comprising a continuous sheet of the binder with the fibrous material dispersed therein as a reinforcement, for example, asphalt or vinyl tiles.

EXAMPLES

A conventional plastic cement or roofing cement is one having the following formulation, by weight.

| | |
|---|---|
| Straight run or blown asphalt cutback 65% solution in mineral solvent | 59 |
| Crude limestone dust (grey) | 18 |
| Mineral solvent, 100° F flash, min app. 300° F to 400° F boiling range | 5 |
| Asbestos fibre: 7R or 7T | 18 |
| | 100 |
| Grease Cone Penetration 77° F 150 gm. total weight | about 300 1/10 mm. |

A similar composition can be prepared following the teachings of the invention but employing a significantly lesser amount of urea-formaldehyde fibrous material than asbestos.

| | |
|---|---|
| Straight run or blown asphalt cutback, 65% in mineral solvent | 51.5 |
| Crude limestone dust (grey) | 39.5 |
| Mineral solvent, 100° F flash, min. app. 200° F to 400° F boiling range | 4.1 |
| Urea-formaldehyde fibrous material | 4.9 |
| | 100.0 |
| Grease Cone Penetration 77° F 150 gm. total weight: about 300 1/10 mm. | |

A lesser amount of urea-formaldehyde fibrous material was necessary since it has higher thickening and reinforcing properties than asbestos.

Both the asphalt-containing composition and the compositions of the invention were made by the same method detailed below.

The asphalt was measured into a paddle or ribbon type mixer having a capacity of about 600 Imperial Gallons and was slowly mixed; the crude limestone was added to the asphalt during the slow mixing and mixing was continued at a low speed of about 30 r.p.m. for 5 minutes.

The fibrous material was added slowly and the mixing was continued at low speed for about 10 minutes.

The mixer was stopped and a liter sample was drawn from the mixture. The sample was adjusted to a temperature of 77° F, stirring constantly by hand. A portion of the sample at 77° F was introduced into a brass grease cup which had previously been brought to a temperature of 77° F in a controlled temperature bath.

The consistency of the material was read on the penetrometer and three consecutive readings were made and averaged out.

If the desired consistency was not reached (300 to 350 depending upon the season) more mineral solvent was added to the mixer and the mixture mixed for a further 5-minute period after which the consistency was again tested; this was repeated until the desired consistency was obtained.

The quantity of mineral solvent in the composition is variable from 1 to 10% and is dependent upon the consistency of the cutback, the absorption characteristics of the limestone and the fibrous material and the desired consistency in the end product.

The relative amounts of the various ingredients can of course, be varied considerably depending on the desired characteristics.

I claim:

1. A composition comprising an organic binder in a liquid vehicle having dispersed therein a thickening and reinforcing amount of fibers of an amorphous, fibrous, cellular, absorbent organic material.

2. A composition according to claim 1, wherein said fibrous material is characterized by a complex microscopic structure of closed and open cells interspersed with irregular and discontinuous capillaries.

3. A composition according to claim 2, wherein said capillaries are from 5 to 50 microns in length.

4. A composition according to claim 3, wherein said structure is composed of clumps of 2 to 15 microns diameter and said capillaries comprise straight, substantially L-shaped and substantially Y-shaped tubes.

5. A composition according to claim 1, containing from 1 to 30%, by weight, of said fibrous material based on said binder.

6. A composition according to claim 5, wherein said liquid vehicle comprises a solvent for said organic binder.

7. A composition according to claim 6, wherein said organic binder is a bituminous material.

8. A composition according to claim 6, wherein said organic binder is a natural or synthetic resin or polymer.

9. A composition according to claim 7, in the form of a moldable or trowelable composition.

10. A composition according to claim 8, in the form of a brushable or sprayable composition.

11. A moldable composition comprising a moldable, solidifiable organic binder in a liquid vehicle having dispersed therein from 1 to 30%, by weight, based on the weight of binder, of an amorphous, cellular, fibrous organic material comprising a disintegrated foam of urea-formaldehyde.

12. A composition according to claim 11, wherein said fibrous material is characterized by a complex microscopic structure of closed and open cells interspersed with irregular and discontinuous capillaries of 5 to 50 microns in length.

13. A composition according to claim 12, further containing a particulate inert filler, and wherein said organic binder is a bituminous material.

14. A coated substrate comprising a substrate having a coating thereon comprising a film forming organic binder containing a reinforcing amount of an amorphous, cellular absorbent urea-formaldehyde fibrous material.

15. A self-supporting sheet comprising a sheet forming organic binder containing a reinforcing amount of an amorphous, cellular, absorbent urea-formaldehyde fibrous material which is characterized by a complex microscopic structure of closed and open cells interspersed with irregular and discontinuous capillaries of 5 to 50 microns in length.

* * * * *